United States Patent
Kobayashi

(10) Patent No.: US 8,187,129 B2
(45) Date of Patent: May 29, 2012

(54) DRIVING BELT, AND ASSEMBLING DEVICE, ASSEMBLING METHOD AND MANUFACTURING METHOD THEREOF

(75) Inventor: Daisuke Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 485 days.

(21) Appl. No.: 12/438,739

(22) PCT Filed: Aug. 22, 2007

(86) PCT No.: PCT/JP2007/066700
§ 371 (c)(1),
(2), (4) Date: Feb. 25, 2009

(87) PCT Pub. No.: WO2008/026612
PCT Pub. Date: Mar. 6, 2008

(65) Prior Publication Data
US 2009/0203478 A1    Aug. 13, 2009

(30) Foreign Application Priority Data
Aug. 28, 2006   (JP) .................... 2006-231273

(51) Int. Cl.
*F16G 1/22* (2006.01)
*F16G 5/16* (2006.01)

(52) U.S. Cl. ............................................ 474/242

(58) Field of Classification Search .............. 474/237, 474/240, 242, 253, 254, 265, 272
See application file for complete search history.

(56) References Cited

U.S. PATENT DOCUMENTS
1,441,656 A * 1/1923 Bosse ........................ 606/215
1,624,428 A * 4/1927 Naito .......................... 132/284
(Continued)

FOREIGN PATENT DOCUMENTS
EP   0 151 396 A2   8/1985
(Continued)

OTHER PUBLICATIONS

Extended European search report issued Dec. 3, 2010, in Application No. / Patent No. 07806177.7-1252 / 2058554 PCT/JP2007066700.

(Continued)

*Primary Examiner* — Thomas Will
*Assistant Examiner* — Joan Misa
(74) *Attorney, Agent, or Firm* — Oblon, Spivak, McClelland, Maier & Neustadt, L.L.P.

(57) ABSTRACT

An assembling device, an assembling method and a manufacturing method of a driving belt, which can facilitate fitting of rings into a recess of an element to improve productivity of the driving belt.

The driving belt V, in which two rows of rings 8a and 8b are accommodated parallel to each other in a recess 7 of a plurality of elements 1 interlinked annularly in a manner to situate the recess 7 to open to an outer circumferential side, and in which the rings 8a and 8b are held in an inner circumferential side of the protruding portions 9 formed on an opening end of inner walls 6 of the recess 7 to prevent detachment of the rings 8a and 8b from the recess 7, comprises: a ring holding member 8c for restricting a relative movement between the rings 8a and 8b aligned parallel to each other entirely in its length direction without being overlapped.

8 Claims, 5 Drawing Sheets

U.S. PATENT DOCUMENTS

| | | | |
|---|---|---|---|
| 4,303,403 A * | 12/1981 | Lamers | 474/201 |
| 4,371,361 A * | 2/1983 | Giacosa | 474/201 |
| 4,643,702 A * | 2/1987 | Cuypers | 474/242 |
| 4,645,478 A | 2/1987 | Cuypers | |
| 4,894,049 A | 1/1990 | Koppelaars | |
| 6,074,317 A * | 6/2000 | Kobayashi | 474/201 |
| 6,440,023 B2 * | 8/2002 | Kanehara et al. | 474/242 |
| 6,440,024 B1 * | 8/2002 | Kobayashi | 474/242 |
| 6,679,798 B1 * | 1/2004 | Takagi et al. | 474/242 |
| 6,705,963 B2 * | 3/2004 | Smeets et al. | 474/242 |
| 2007/0072721 A1 | 3/2007 | Takagi et al. | |

FOREIGN PATENT DOCUMENTS

| | | |
|---|---|---|
| EP | 1 662 174 A1 | 5/2006 |
| JP | 59-66048 | 5/1984 |
| JP | 60 69346 | 4/1985 |
| JP | 61-22183 | 5/1986 |
| JP | 61127944 A * | 6/1986 |
| JP | 2000 249195 | 9/2000 |
| JP | 2001 193796 | 7/2001 |
| JP | 2002 5241 | 1/2002 |
| JP | 2002 276740 | 9/2002 |
| JP | 2004-66434 | 3/2004 |
| RU | 1782298 A3 | 12/1992 |
| SU | 1459614 A3 | 2/1989 |
| WO | WO2005/019684 | 3/2005 |

OTHER PUBLICATIONS

U.S. Appl. No. 12/439,175, filed Feb. 27, 2009, Kobayashi.
U.S. Appl. No. 12/439,014, filed Feb. 26, 2009, Kobayashi.
U.S. Appl. No. 12/439,173, filed Feb. 27, 2009, Kobayashi.
U.S. Appl. No. 12/439,172, filed Feb. 27, 2009, Kobayashi.
Decision of Grant issued Feb. 28, 2012 in Japanese Patent Application No. 2009-235333 with English annotations.

* cited by examiner

DRIVING BELT, AND ASSEMBLING DEVICE, ASSEMBLING METHOD AND MANUFACTURING METHOD THEREOF

TECHNICAL FIELD

This invention relates to a driving belt in which a plurality of plate elements interlinked with one another in a circular manner is fastened by an endless annular ring, and an assembling device, an assembling method and a manufacturing method thereof.

BACKGROUND ART

In the prior art, a geared transmission capable of changing a gear stage thereof stepwise, and a continuously variable transmission capable of varying a speed change ratio steplessly are available as a transmission mechanism for transmitting power between rotary members. For example, a belt-type continuously variable transmission and a toroidal-type continuously variable transmission are known as the continuously variable transmission. Specifically, the belt-type continuously variable transmission is a transmission varying a speed change ratio continuously using a pair of drive pulleys and a pair of driven pulleys, and a driving belt applied to those pulleys. The known endless driving belt used in such belt-type continuously variable transmission is prepared by arranging a plurality of plate members called an "element" or a "block" in a circular manner while connecting the plate members with one another, and fastening the interlinked plate members by an annular belt called a "band" or a "carrier".

When the driving belt of this kind applied to the drive and driven pulleys is driven by driving the drive pulley, a frictional force acts on a contact portion between the element and the drive pulley, and a compressive force is applied to the elements in the arranging direction thereof, i.e., in the thickness direction thereof according to a torque of the drive pulley. The compressive force applied to the element being contacted with the drive pulley is transmitted to the element being contacted with the driven pulley via the elements existing between the drive and driven pulleys. When the compressive force is transmitted to the element being contacted with the driven pulley, a frictional force is generated at the contact portion between the element and the driven pulley, and a torque to rotate the driven pulley is established according to the transmitted compressive force. The power is thus transmitted between the drive and driven pulley through the driving belt.

One example of above-explained driving belt is disclosed in Japanese Patent Laid-Open No. 2000-249195. The "High-Loaded Transmission Belt" taught by Japanese Patent Laid-Open No. 2000-249195 is composed of a center belt and blocks reinforced against lateral pressure, and it is applied to a main prime mover and an auxiliary prime mover of automobiles and agricultural machineries. Specifically, the "High-Loaded Transmission Belt" comprises a block (i.e., an element) which is so constituted that two belt sides having lock parts in its top end are connected to each other in their bottom ends by a connecting member, and two rows of endless carriers (i.e., rings) fixedly fitted into an engagement groove opening between the lock parts. The belt side portion of the element is provided individually with a convex portion and a concave portion on each face so that the elements can interlink with one another. Therefore, the interlinked elements can be aligned even when the belt is running.

In addition to above, Japanese Patent Laid-Open No. 2001-193796 discloses an invention relating to "Element for Metal Belt and Metal Belt" for continuously variable transmissions of vehicles. The metal belt taught by Japanese Patent Laid-Open No. 2001-193796 comprises: a metal endless band (i.e., a ring) applied to annular grooves of a drive and a driven pulleys; a plurality of metal element composed of a body portion to be contacted with the annular groove of the pulley, a pair of pillars erected on the body portion and faced with each other, an engagement protruded portion formed on a leading end of the pillar, and an opening for inserting the band (i.e., a recessed portion) formed between the engagement protruded portions; and an endless metal falling preventing body somewhat wider than the band. The falling preventing body can be bent to narrow its width when it is inserted in between the engagement protruded portions to prevent falling of the band.

The transmission belt taught by Japanese Patent Laid-Open No. 2000-249195 comprises lock parts on both of the belt sides of the block to hold the two rows of carriers in the block. According to the transmission belt taught by Japanese Patent Laid-Open No. 2000-249195, the two rows of carriers have to be overlapped partially when fitting the carriers into the block or detaching the carriers from the block. Specifically, the total width of the carriers has to be reduced narrower than the opening width between the lock parts by twisting the rings to overlap portions of the carriers in its length direction when fitting the carriers into the block or detaching the carriers from the block.

That is, the two rows of carriers can be fitted into the block from the overlapped portion through between the lock parts by partially overlapping the carriers aligned parallel to each other to reduce the total width thereof narrower than the clearance between the lock parts. For example, as shown in accompanying FIG. 8, two rows of rings R1 and R2 are fitted into the recess of the element E from the overlapped portion (shown in the circle "a" in FIG. 8), and the element E holding the rings R1 and R2 is moved in the length direction of the rings R1 and R2 to the portion (shown in the circle "b" in FIG. 8) where the rings R1 and R2 are aligned parallel to each other. As a result, the rings R1 and R2 are situated in an inner circumferential side of the latch portions (in the assembled driving belt) to be fitted in the recess of the element E properly.

In order to overlap the rings aligned parallel to each other partially in its length direction while keeping remaining portion of the rings parallel to each other, the remaining portions of the rings have to be held parallel to each other when overlapping the rings partially.

However, if one of the rings aligned parallel to each other is situated inside of the other ring to be overlapped partially, the remaining portions of the rings move apart from each other and this makes difficult to handle the rings. For example, the inner ring R1 may cross the outer ring R2 as shown in FIG. 9. This makes difficult to fit the rings into the recess of the element. Moreover, the elements holding the rings may be detached from the rings.

Thus, the conventional arts thus far explained are incapable of holding the plurality of rings parallel to each other stably while overlapping the rings partially in its length direction. Therefore, the driving belt cannot be assembled easily by the conventional arts.

DISCLOSURE OF THE INVENTION

The present invention has been conceived noting the technical problems thus far described, and its object is to provide a driving belt, and an assembling device, an assembling method and a manufacturing method thereof capable of fitting the rings into the recess of the elements easily to improve a productivity of the driving belt.

In order to achieve the above-mentioned object, according to the present invention, there is provided a driving belt, in which a plurality of elements is interlinked annularly in a manner to situate a recess thereof to open to an outer circumferential side, and in which a plurality of rings is accommodated parallel to each other in the recess of the element and held in an inner circumferential side of protruding portions formed an opening end side of inner walls of the recess to prevent detachment of the rings, comprising: a ring holding member for restricting a relative movement between the rings aligned parallel to each other entirely in its length direction without being overlapped.

The above-mentioned ring holding member includes a holding ring, which is overlapped tightly on an outer circumferential faces of the rings aligned parallel to each other.

According to another aspect of the present invention, there is provided an assembling device of a driving belt, in which a plurality of elements is interlinked annularly in a manner to situate a recess thereof to open to an outer circumferential side, and in which a plurality of rings is accommodated parallel to each other in the recess of the element and held in an inner circumferential side of protruding portions formed on an opening end side of inner walls of the recess to prevent detachment of the rings, comprising: a ring holding mechanism for restricting a relative movement between the rings aligned parallel to each other entirely in its length direction without being overlapped.

The above-mentioned ring holding mechanism includes a detachable fixing member, which is attached to the rings aligned parallel to each other to restrict a relative movement between the rings.

In addition to above, the above-mentioned ring holding mechanism includes a holding ring, which is overlapped tightly on an outer circumferential faces of the rings aligned parallel to each other to restrict a relative movement between the rings.

According to still another aspect of the present invention, there is provided an assembling method of a driving belt, in which a plurality of elements is interlinked annularly in a manner to situate a recess thereof to open to an outer circumferential side, and in which a plurality of rings is accommodated parallel to each other in the recess of the element and held in an inner circumferential side of protruding portions formed on an opening end side of inner walls of the recess to prevent detachment of the rings, comprising: aligning the plurality of rings parallel to each other in its entire length without being overlapped; overlapping at least a portion of the rings in its length direction while holding the rings parallel to each other by restricting a relative movement between the rings; and fitting the rings into the recess of the element.

Specifically, according the assembling method of the invention, the relative movement between the rings is restricted by attaching a detachable fixing member to the rings aligned parallel to each other, and the fixing member is detached from the rings after fitting the rings into the recess of the element.

Alternatively, the relative movement of the rings is restricted by overlapping a holding ring tightly on an outer circumferential faces of the rings aligned parallel to each other.

According to still another aspect of the present invention, there is provided a manufacturing method of a driving belt, in which a plurality of rings is accommodated parallel to each other in a recess of a plurality of elements, and in which the rings are held by protruding portions formed on an outer circumferential side of inner walls of the recess to prevent detachment of the rings, comprising: arranging the plurality of elements annularly in a manner to situate the recess thereof to open to an outer circumferential side; aligning the plurality of rings parallel to each other in its entire length without being overlapped; overlapping the rings at least a portion thereof in its length direction while holding the rings parallel to each other by restricting a relative movement between the rings; and thereafter fitting the rings in an inner circumferential side of the protruding portions of the elements arranged annularly.

Specifically, according to the manufacturing method of the invention, the relative movement between the rings is restricted by attaching a detachable fixing member to the rings aligned parallel to each other, and the fixing member is detached from the rings after fitting the rings into the recess of the element.

Alternatively, the relative movement between the rings is restricted by overlapping a holding ring tightly on an outer circumferential faces of the rings aligned parallel to each other.

According to the driving belt of the invention, the relative movement between the rings aligned parallel to each other is thus restricted by holding the rings being aligned to each other when fitting the rings into the recess of the element. Therefore, when overlapping the rings partially in its length direction, the remaining portions of the rings can be kept parallel to each other. In other words, the plurality of rings can be kept stably even when the rings are overlapped partially in its length direction. For this reason, the plurality of rings can be fitted easily into the recess of the element so that productivity of the driving belt can be improved.

Specifically, according the driving belt of the invention, the holding ring is overlapped tightly on the outer circumferential faces of the rings constituting the driving belt. Therefore, a relative movement between the rings aligned parallel to each other is restricted by a tensile force of the holding ring or by a friction between an inner face of the holding ring and the outer faces of the rings. As a result, the rings can be held parallel to each other stably while being overlapped partially in its length direction, in the inner circumferential side of the holding ring.

Alternatively, according to the assembling device of invention, the relative movement between the rings aligned parallel to each other is restricted by the ring holding mechanism when fitting the rings into the recess of the element. Therefore, when overlapping the rings partially in its length direction, the remaining portions of the rings can be kept parallel to each other. In other words, the plurality of rings can be kept stably even when overlapped partially in its length direction. For this reason, the plurality of rings can be fitted easily into the recess of the element so that productivity of the driving belt can be improved.

Specifically, according to the assembling device of invention, the relative movement between the rings aligned parallel to each other to constitute the driving belt is restricted by attaching the detachable fixing member to the rings. As a result, the rings can be held parallel to each other stably by the fixing member attached thereto while being overlapped partially in its length direction.

Alternatively, according to the assembling device of invention, the holding ring is overlapped tightly on the outer circumferential faces of the rings constituting the driving belt. Therefore, a relative movement between the rings aligned parallel to each other is restricted by a tensile force of the holding ring or by a friction between an inner face of the holding ring and the outer faces of the rings. As a result, the rings can be held parallel to each other stably while being overlapped partially in its length direction, in the inner circumferential side of the holding ring.

On the other hand, according to the assembling or manufacturing method of the invention, first of all, the plurality of rings are aligned parallel to each other, and then, the rings are overlapped partially in its length direction while holding the remaining portion parallel to each other. Therefore, when overlapping the rings partially in its length direction, the remaining portions of the rings can be kept parallel to each other. In other words, the plurality of rings can be kept stably even when overlapped partially in its length direction. For this reason, the plurality of rings can be fitted easily into the recess of the element so that productivity of the driving belt can be improved.

Specifically, according to the assembling or manufacturing method of the invention, the relative movement between the rings aligned parallel to each other to constitute the driving belt is restricted by attaching the detachable fixing member to the rings. Then, the rings are overlapped partially in its length direction while holding the remaining portion parallel to each other. After that, the rings are fitted into the recess of the element from the overlapped portion and the fixing member is detached from the rings. Therefore, the driving belt can be manufactured by fitting the rings into the recess of the element while keeping the rings to be overlapped partially in a stable manner.

Alternatively, according to the assembling or manufacturing method of the invention, the relative movement of the rings aligned parallel to each other to constitute the driving belt is restricted by overlapping the holding ring tightly on the outer circumferential faces of the rings constituting the driving belt. Then, the rings are overlapped partially in its length direction while holding the remaining portion parallel to each other. Therefore, the driving belt can be manufactured by fitting the rings into the recess of the element while keeping the rings to be overlapped partially in a stable manner.

BEST MODE FOR CARRYING OUT THE INVENTION

Next, this invention will be explained with reference to the accompanying drawings. A configuration of the driving belt and the assembling device thereof will be explained first of all, and then, examples of assembling and manufacturing the driving belt according to the invention are to be explained sequentially.

FIRST EXAMPLE

Figure 1:
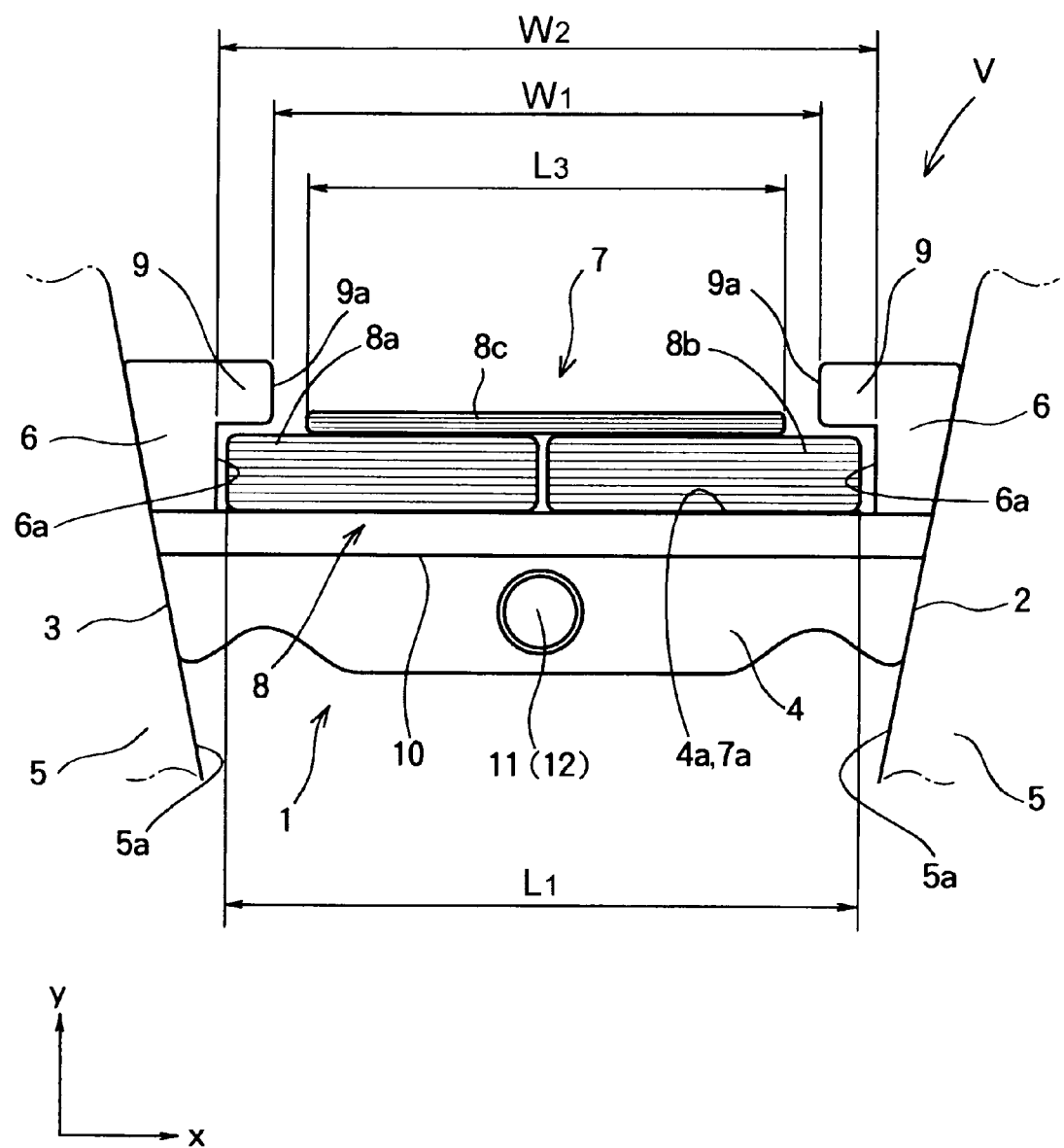
FIG. 1 is a front view schematically showing an example of the driving belt of the invention.

First of all, a configuration of the element and the rings constituting the driving belt according to the first example the invention will be explained with reference to FIGS. 1 to 5. FIG. 1 shows an example of a driving belt V to be applied to a drive pulley (i.e., an input shaft side pulley) and a driven pulley (i.e., an output shaft side pulley) of a belt type continuously variable transmission so as to transmit a power between those pulleys. An element 1 is a metal plate member comprising a base portion (or main body) 4. Both lateral faces 2 and 3 of the base portion 4, that is, both lateral ends (in the direction of x-axis in FIG. 1) of the base portion 4 are inclined. The inclined lateral faces 2 and 3 are frictionally contacted with a V-shaped groove 5a of a drive or driven pulley 5 of the belt type continuously variable transmission to transmit a torque.

The base portion 4 comprises columns 6 erected vertically (in the direction of y-axis in FIGS. 1 and 2) at both lateral ends (in the direction of x-axis in FIG. 1) thereof. Accordingly, a recess 7 is formed by an upper face (or a top edge) 4a of the base portion 4 and both inner walls 6a of the columns 6 facing to the width center of the base portion 4. Thus, the recess 7 opens upwardly, in other words, the recess 7 opens toward an outer circumference of the driving belt V.

Specifically, the recess 7 is a space for accommodating an endless ring 8 for fastening the elements 1 interlinked closely with one another in a circular manner. That is, the upper face 4a functions as a saddle face 4a onto which an inner circumferential face of the ring 8 is fitted.

The ring 8 is a layered ring made of metal comprising a plurality of annular belt-like layers overlapped in a circumferential direction. According to the first example, two rings 8a and 8b are arranged parallel to each other in the recess 7. Here, a configuration, dimensions, material, strength and so on of the rings 8a and 8b are identical to each other.

Figure 3:
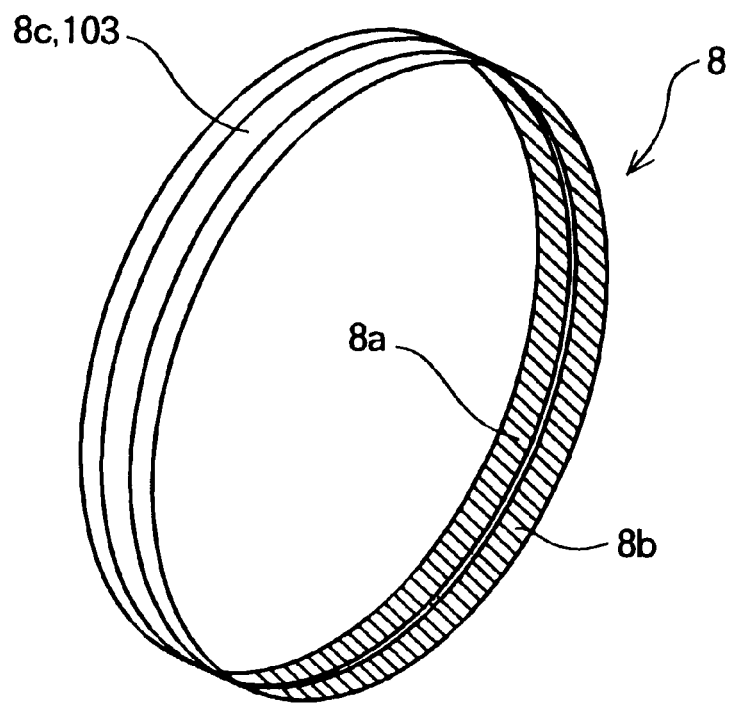
FIG. 3 is an explanatory drawing schematically showing the ring holding member of the assembling device which is overlapped on the rings of the driving belt.

In addition, a holding ring 8c is overlapped on outer circumferential faces of the rings 8a and 8c. The holding ring 8c restricts a relative movement between the rings 8a and 8b aligned parallel to each other without being overlapped. That is, the holding ring 8c restricts a movement of the ring 8a relative to the ring 8b and a movement of the ring 8b relative to the ring 8a to keep those rings 8a and 8b parallel to each other. Specifically, an inner circumferential face of the holding ring 8c is fitted tightly on the outer circumferential faces of the rings 8a and 8b. Therefore, the relative movement between the rings 8a and 8b is restricted by a tensile force of the holding ring 8c or by a friction between an inner face of the holding ring 8c and the outer faces of the rings 8a and 8b. As a result, as shown in FIG. 3, the rings 8a and 8b can be held parallel to each other stably.

Figure 5:
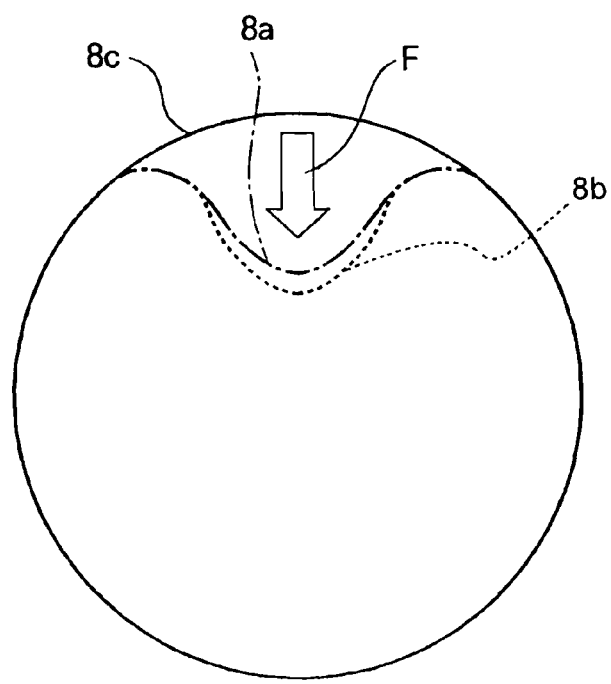
FIG. 5 is a view schematically showing a behavior of the rings on which the ring holding member is overlapped, when the rings is overlapped.

As shown in FIG. 5, the rings 8a and 8b being kept parallel to each other by the holding ring 8c overlapped thereon can be released partially and temporarily from the restriction of the relative movement therebetween, for example, by applying an external force to the rings 8a and 8b in the direction represented by "F" in FIG. 5 to buckle the rings 8a and 8b to the inner circumferential side. As a result, the rings 8a and 8b can be overlapped at the portions thereof released from the restriction on the relative movement therebetween.

Preferably, the holding ring 8c is made of the same material as those of the rings 8a and 8b to add the strength thereof to the strength of the ring 8 itself thereby enhancing the strength and durability of the ring 8.

The element 1 comprises protruding portions 9. Each protruding portion 9 is formed integrally with the column 6 and protrudes toward a width center of the base portion 4 from an outer circumferential side of the columns 6, that is, both end faces 9a of the protruding portions 9 are faced inwardly to be opposed to each other. In other words, the protruding portion 9 is formed on both opening ends of the recess 7 above lateral ends of the ring 8a and 8b, i.e., on the end portions of the inner walls 6a, and both of the protruding portions 9 protrude toward a width center of the recess 7 (i.e., in the direction of x-axis in FIG. 1). That is, the clearance between the end faces 9a is an opening width W1 of the recess 7. On the other hand, a width of the recess 7 at bottom portion 7a (i.e., the upper face 4a) side, specifically, the clearance between the inner walls 6a is wider than the opening width W1, and which is represented by W2.

The elements 1 are interlinked with one another in a circular manner and fastened by the ring 8. The elements 1 thus fastened by the ring 8 is applied to the drive and driven pulleys 5. In case the driving belt V is applied to the pulleys 5, clearances between the elements 1 are narrowed gradually toward a rotational center of the pulleys 5 in a region where the elements 1 are contacted with the pulleys 5, and the elements 1 are eventually contacted with one another at its portion close to the rotational center of the pulley 5. For this reason, a thickness of the element 1 has to be thinned at its lower portion, that is, at the portion close to the rotational center of the pulley 5, as illustrated in FIGS. 1 and 2.

Figure 2:
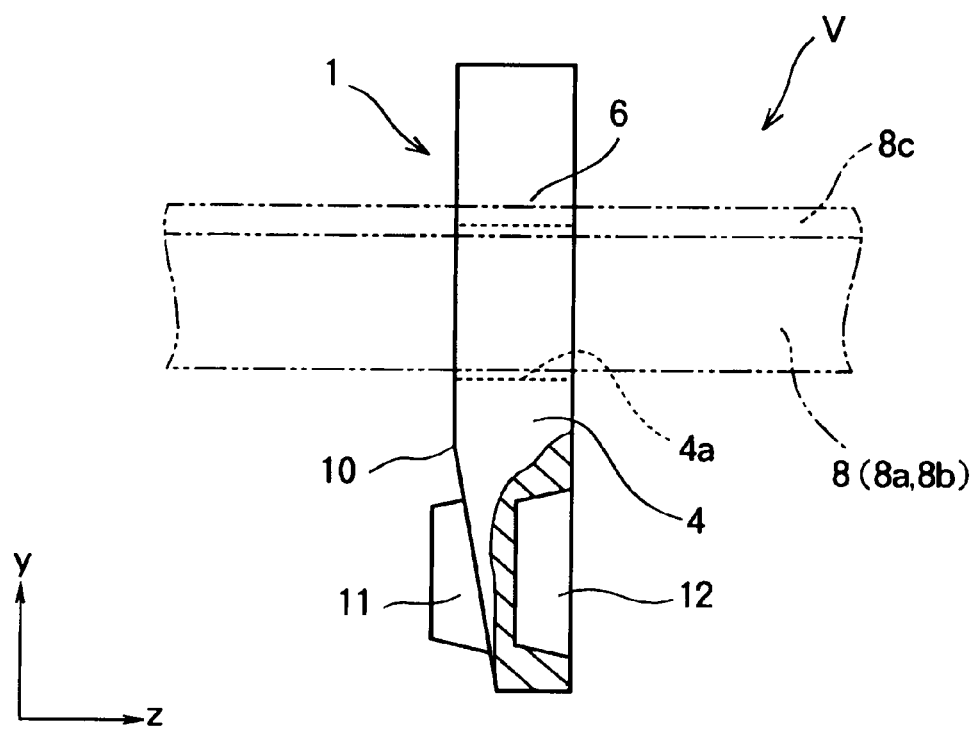
FIG. 2 is a side sectional view schematically showing a section of the driving belt of the invention.

According to the example shown in FIG. 2, one of the faces of the base portion 4 i.e., the left face in FIG. 2 is thinned gradually from a predetermined portion below the saddle face 4a. In case the belt V is being applied to the pulleys 5, the elements 1 are contacted with the adjoining element 1 at the portion where the thickness thereof starts to be reduced, in the region where the elements 1 are contacted with the pulley 5, in other words, in a curving region of the belt V. That is, an edge of a boundary of thickness functions as a rocking edge 10.

A male connection 11 and a female connection 12 are respectively formed on each face of the base portion 4 being opposed to the adjoining element 1, at the center of width of the element 1. Specifically, as shown in FIG. 2, the male connection 11 of circular truncated cone is formed on one of the faces of the base portion 4 where the rocking edge 10 is formed. On the other hand, the bottomed cylindrical female connection 12 to which the adjoining male connection 11 is inserted loosely is formed on a face opposite to the face on which the male connection 11 is formed. Therefore, the elements 1 can be kept in line within a straight region of the belt V where the element 1 is not being contacted with the pulley 5.

That is, a relative position of the elements 1 within the straight region of the driving belt V can be determined in both vertical and horizontal directions in FIG. 1 by joining the male and female connections 11 and 12. For this reason, chattering of the driving belt V is prevented so that the belt V can be driven smoothly when the belt-type continuously variable transmission is driven.

Since only one male connection 11 and one female connection 12 are formed on each face of the element 1 being opposed to the adjoining element 1 at the width center of the element 1, and those male and female connections 11 and 12 are individually joined with the adjoining male or female connection 11 or 12, the elements 1 interlinked in a circular manner can swing relatively with each other, in other words, the interlinked elements 1 can pivot relatively with each other.

As mentioned above, the ring 8 comprises two rings such as the ring 8a and the ring 8b. Therefore, the rings 8a and 8b can be overlapped partially while keeping the remaining portion of the rings 8a and 8b parallel to each other by overlapping the rings 8a and 8b in its thickness direction at a portion thereof in its length direction.

As shown in FIG. 1, a width L1 of the ring 8, i.e., a total width of the first ring 8a and the second ring 8b aligned parallel to each other is wider than the aforementioned opening width W1 but narrower than the width W2. However, as indicated by L2 in FIG. 4, the total width of the ring 8 can be reduced narrower than the opening width W1 by overlapping the first ring 8a and the second ring 8b.

More specifically, according to the element 1 and the ring 8 of the invention, the opening width W1 of the recess 7 is narrower than the width L1 of the ring 8, and the width W2 of the recess 7 is wider than the width L1 of the ring 8. In other words, the width L2 of the overlapped portion of the rings 8a and 8b is narrower than the opening width W1 of the recess 7, and the width L1 of the rings 8a and 8b aligned parallel to each other is wider than the opening width W1 of the recess 7 but narrower than the width W2 of the recess 7.

Therefore, the ring 8 can be fitted into the recess 7 from the overlapped portion of the rings 8a and 8b through the clearance between the end faces 9a. After the overlapped portion of the rings 8a and 8b is thus fitted into the recess 7 from the clearance between the end faces 9a, the element 1 is moved to the portion where the rings 8a and 8b are aligned parallel to each other so that the rings 8a and 8b can be fitted into the spaces between the protruding portions 9 and the bottom 7a of the recess 7. Alternatively, it is also possible to align the overlapped rings 8a and 8b parallel to each other again in the recess 7. As a result, the rings 8a and 8b can be held in the recess 7 while being aligned parallel to each other, and disengagement of the ring 8 from the element 1 is thereby prevented.

In addition to above, a width L3 of the holding ring 8c is narrower than the opening width W1 of the recess 7. Therefore, the holding ring 8c can be overlapped on the rings 8a and 8b in the recess 7 without contacting with both of the protruding portions 9.

Thus, as has been explained, in case of overlapping the ring 8, the rings 8a and 8b are overlapped partially in its length direction, while restricting the relative movement between the rings 8a and 8b by the holding ring 8c to keep the remaining portions of the rings 8a and 8b parallel to each other. Therefore, the rings 8a and 8b can be overlapped partially in its length direction in a stable manner while keeping the remaining portions of the rings 8a and 8b parallel to each other in the inner circumference of the holding ring 8. As a result, the ring 8 can be fitted into the recess 7 of the element 1 easily, and productivity of the driving belt V is thereby improved.

SECOND EXAMPLE

Here will be explained the second example of the assembling device M of the driving belt V with reference to the accompanying FIGS. 6 and 7. As explained above, the first example is the example to facilitate fitting work of the rings 8a and 8b into the recess 7 of the element 1 by overlapping the holding ring 8c on the outer circumferential faces of the rings 8a and 8b aligned parallel to each other to restrict a relative movement between the rings 8a and 8b. On the other hand, in the second example, an assembling device M of the driving belt V is used to facilitate fitting work of the rings 8a and 8b into the recess 7 of the element 1 by restricting a relative movement between the rings 8a and 8b aligned parallel to each other.

Figure 6:
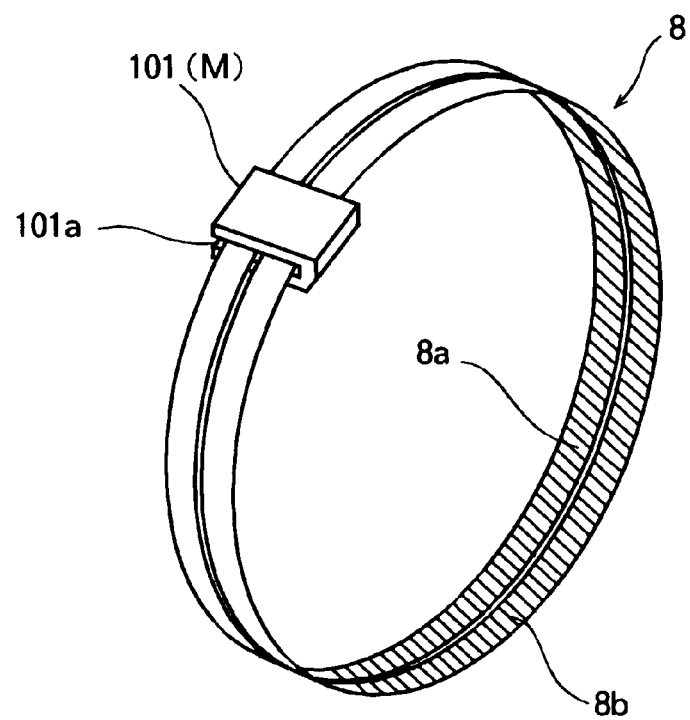
FIG. 6 is a view schematically showing an example of the ring holding mechanism of the invention.

As shown in FIG. 6, the rings 8a and 8b aligned parallel to each other are nipped by a fixing member 101 corresponding to the ring holding mechanism of the assembling device M, at a predetermined portion of the length direction thereof. For example, the fixing member 101 is a member like a clip for restricting a relative movement between the rings 8a and 8b aligned parallel to each other by holding the rings 8a and 8b in a holding space 101a. Specifically, the rings 8a and 8b are inserted into the holding space 101a, and those rings 8a and 8b are held therein by a friction between contact faces of the rings 8a and 8b and a contact face of the holding space 101a, or by an elastic force to close the fixing member 101.

As explained above, the fixing member 101 is a member like a clip, therefore, the fixing member 101 can not only be attached to the rings 8a and 8b aligned parallel to each other easily but also be detached from the rings 8a and 8b easily.

Figure 7:
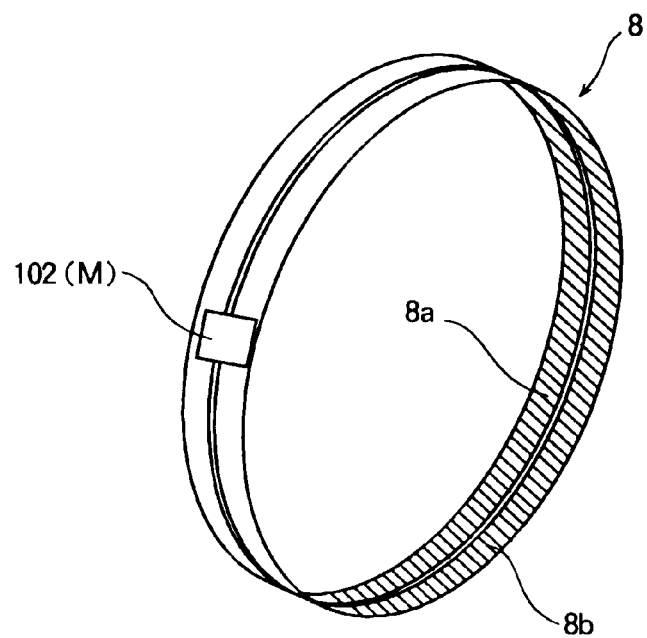
FIG. 7 is a view schematically showing another example of the ring holding mechanism of the invention.
Figure 8:
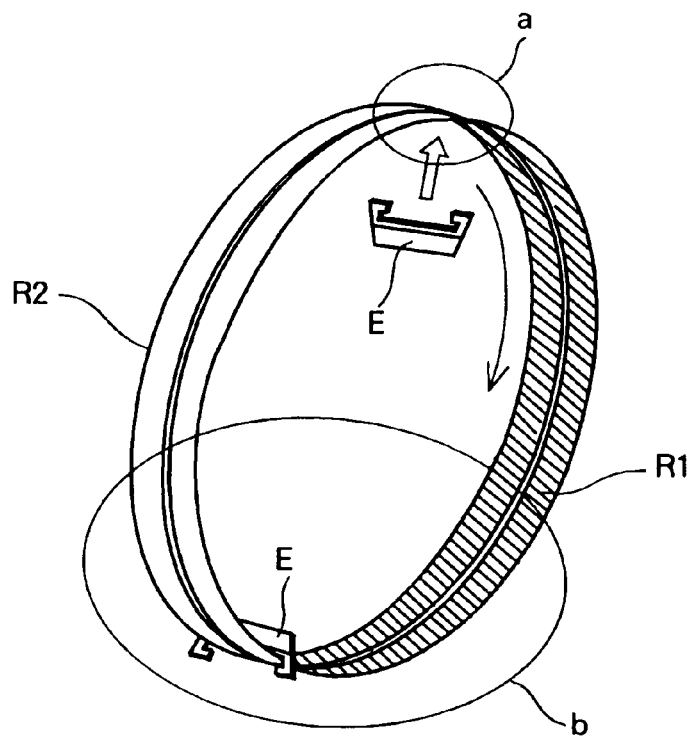
FIG. 8 is a view schematically showing the assembling device and method of the driving belt according to the conventional arts.
Figure 9:
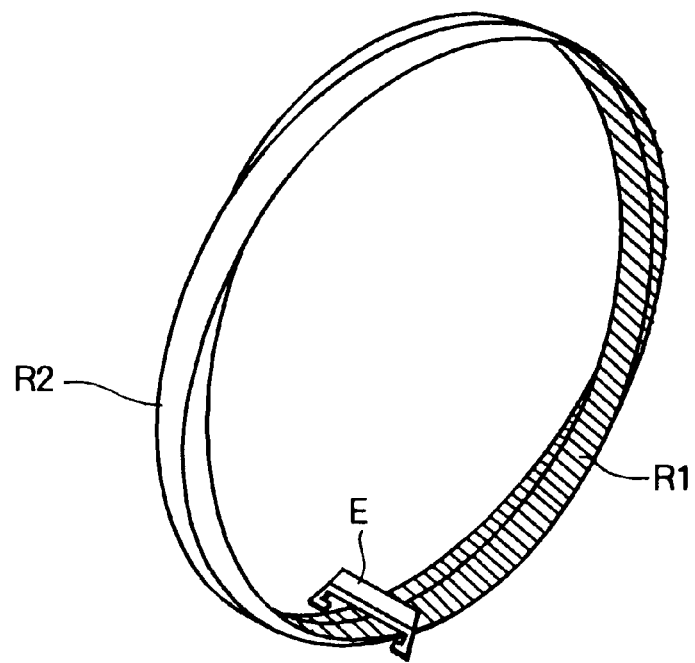
FIG. 9 is a view schematically showing the assembling device and method of the driving belt according to the conventional arts.

FIG. 7 shows a modified example of the second example of the assembling device M. As shown in FIG. 7, the rings 8a and 8b aligned parallel to each other are held by a fixing member 102 corresponding to the ring holding mechanism of the assembling device M. The fixing member 102 is an adhesive member such as a permanent magnet, an adhesive tape or the like, therefore, a relative movement between the rings 8a and 8b is restricted by a magnetic force or adhesiveness of the fixing member 102 attached thereto.

As explained above, the fixing member 102 is made of a permanent magnet, an adhesive tape or the like, therefore, the fixing member 102 can also be attached and detached to/from the rings 8a and 8b aligned parallel to each other easily.

Thus, the assembling device M of the driving belt V according to the second example can be attached and detached to/from the rings 8a and 8b aligned parallel to each other easily. That is, the fixing members 101 and 102 are attached to the rings 8a and 8b to keep those rings 8a and 8b parallel to each other, in other words, to function as the ring holding member for restricting a relative movement between the rings 8a and 8b. Therefore, when the rings 8a and 8b are fitted into the recess 7 of the element 1, the rings 8a and 8b can be kept to be overlapped partially in its length direction in a stable manner while keeping the remaining portions thereof parallel to each other by restricting a relative movement therebetween by the assembling device M. As a result, the ring 8 can be fitted into the recess 7 of the element 1 easily, and productivity of the driving belt V is thereby improved.

THIRD EXAMPLE

Here will be explained the third example of the assembling device M of the driving belt V with reference to the accompanying FIGS. 1 and 3. In the above-explained second example, the fixing members 101 and 102 are used as the ring holding member of the assembling device M. On the other hand, in the third example, a holding ring is overlapped tightly on the outer circumferential faces of the rings 8a and 8b aligned parallel to each other as the ring holding mechanism of the assembling device M for restricting relative movement between the rings 8a and 8b.

As shown in FIG. 3, a holding ring 103 functioning as the ring holding mechanism of the assembling device M is overlapped on the outer circumferential faces of the rings 8a and 8b aligned parallel to each other. More specifically, an inner circumferential face of the holding ring 103 is overlapped tightly on the outer circumferential faces of the rings 8a and 8b aligned parallel to each other. Therefore, a relative movement between the rings 8a and 8b aligned parallel to each other is restricted by a tensile force of the holding ring 103 or by a friction between an inner face of the holding ring 103 and the outer faces of the rings 8a and 8b.

As shown in FIG. 1, a width L3 of the holding ring 103 is narrower than the opening width W1 of the recess 7. Therefore, the holding ring 8c can be fitted into the recess 7 while being overlapped on the rings 8a and 8b, without contacting with both of the protruding portions 9 of the recess 7.

The holding ring 103 is made of the same material as those of the rings 8a and 8b to add the strength thereof to the strength of the ring 8 itself thereby enhancing the strength and durability of the ring 8.

In addition to above, a material of the holding ring 103 may also be a material other than the metal material, for example, a material of the holding ring 103 may be resin, rubber, cloth, leather and so on. In this case, the holding ring 103 can not only be overlapped on the rings 8a and 8b easier but also detached from rings 8a and 8b easier.

Thus, according to the assembling device M of the third example, the inner circumferential face of the holding ring 103 functioning as the ring holding mechanism is overlapped tightly on the outer circumferential faces of the rings 8a and 8b aligned parallel to each other to restrict a relative movement between the rings 8a and 8b. Therefore, when the rings 8a and 8b are fitted into the recess 7 of the element 1, the rings 8a and 8b can be kept to be overlapped partially in its length direction in a stable manner while keeping the remaining portions thereof parallel to each other by restricting a relative movement therebetween by the assembling device M. As a result, the ring 8 can be fitted into the recess 7 of the element 1 easily, and productivity of the driving belt V is thereby improved.

FIRST ASSEMBLING AND MANUFACTURING EXAMPLE

Next, here will be explained the first example of assembling and manufacturing method of the driving belt according to the invention with reference to accompanying FIGS. 5 to 7. This first assembling and manufacturing example is an example of using the assembling device M of the driving belt V explained in the above-explained second example.

First of all, the rings 8a and 8b are aligned parallel to each other without being overlapped. Then, as shown in FIG. 6, the fixing member 101 as a clip-like member is attached to the rings 8a and 8b at a predetermined portion in the length direction of the rings 8a and 8b. Specifically, the rings 8a and 8b are inserted into the holding space 101a of the fixing member 101 and held parallel to each other.

As explained, the fixing member 101 is adapted to hold the rings 8a and 8b in the holding space 101a by a friction between contact faces of the rings 8a and 8b and a contact face of the holding space 101a, or by an elastic force to close the fixing member 101. Therefore, a relative movement between the rings 8a and 8b is restricted by the fixing member 101 attached thereto so that the rings 8a and 8b can be kept parallel to each other.

Alternatively, as shown in FIG. 7, the fixing member 102 such as a permanent magnet, an adhesive tape or the like is attached to the rings 8a and 8b at a predetermined portion in the length direction of the rings 8a and 8b so as to hold the rings 8a and 8b by a magnetic force or adhesiveness thereof. As a result, a relative movement between the rings 8a and 8b is restricted by of the fixing member 102 attached thereto so that the rings 8a and 8b can be kept parallel to each other.

Then, the rings 8a and 8b kept parallel to each other by the fixing member 101 or 102 are overlapped in its thickness direction at a predetermined portion in its length direction, or at a portion diametrically opposed to the portion where the fixing member 101 or 102 is attached.

As described, in case one of the rings aligned parallel to each other is situated inside of the other ring to be overlapped partially, the remaining portions of the rings move apart from each other and this makes difficult to handle the rings that is, to keep the rings parallel to each other. In order to solve this kind of problem, according to the assembling and manufacturing method of the invention, the fixing member 101 or 102 is attached to the rings 8a and 8b aligned parallel to each other to restrict a relative movement therebetween, and the rings 8a and 8b are overlapped partially in its length direction. For this reason, the rings 8a and 8b can be kept parallel to each other stably, and the overlapped portion of the rings 8a and 8b can also be kept stably.

After thus overlapping the rings 8a and 8b partially in its length direction, the ring 8 is fitted into the recess 7 of the element 1 from the overlapped portion. At this stage, the overlapped portion of the rings 8a and 8b are kept stably as explained, therefore, the ring 8 can be fitted easily into the recess 7 of the element 1 from the overlapped portion.

Then, after fitting the ring 8 into the recess 7 of predetermined pieces of the element 1, or after a completion of such fitting work of the ring 8 into the recess 7 of the element 1, the fixing member 101 or 102 is detached from the ring 8. That is, the assembly and manufacture of the driving belt V according to the first assembling and manufacturing example of the invention is completed.

Thus, according to the first assembling and manufacturing example of the invention, when fitting two rows of rings 8a and 8b into the recess 7 of the element 1 to assemble the driving belt V, the rings 8a and 8b are aligned parallel to each other first of all. Then, the detachable fixing member 101 or 102 is attached to the rings 8a and 8b to restrict a relative movement between the rings 8a and 8b thereby keeping the rings 8a and 8b parallel to each other. The rings 8a and 8b to which the fixing member 101 or 102 is attached is thereafter overlapped partially in its length direction. Therefore, when overlapping the rings 8a and 8b, the remaining portions of the rings 8a and 8b can be kept parallel to each other stably, and the overlapped portion of the rings 8a and 8b can also be kept stably. For this reason, the ring 8 can be fitted into the recess 7 of the element 1 easily, and productivity of the driving belt V is thereby improved.

SECOND ASSEMBLING AND MANUFACTURING EXAMPLE

Figure 4:
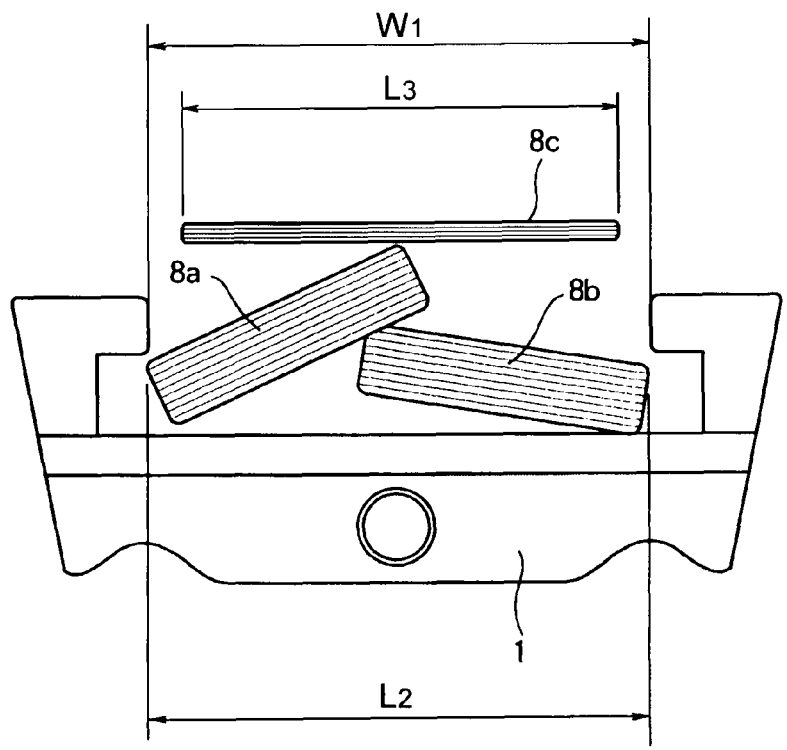
FIG. 4 is a view schematically showing the overlapped rings of the driving belt and the ring holding member of the invention.

Next, here will be explained the second example of assembling and manufacturing method of the driving belt according to the invention with reference to accompanying FIGS. 3 to 5. This second assembling and manufacturing example is an example of using the assembling device M of the driving belt V explained in the above-explained third example.

First of all, the rings 8a and 8b are aligned parallel to each other without being overlapped. Then, as shown in FIG. 3, the holding ring 103 is overlapped on the outer circumferential faces of the rings 8a and 8b aligned parallel to each other. More specifically, an inner circumferential face of the holding ring 103 is overlapped tightly on the outer circumferential faces of the rings 8a and 8b aligned parallel to each other. Therefore, a relative movement between the rings 8a and 8b aligned parallel to each other is restricted by a tensile force of the holding ring 103 or by a friction between an inner face of the holding ring 103 and the outer faces of the rings 8a and 8b, and the rings 8a and 8b are kept parallel to each other.

Then, the rings 8a and 8b kept parallel to each other by the holding ring 103 are overlapped in its thickness direction, at a predetermined portion in its length direction.

As explained, the rings 8a and 8b can be overlapped easily at a portion of its length direction while keeping the remaining portions thereof parallel to each other and the overlapped portion of the rings 8a and 8b can be kept stably, by overlapping the holding ring 103 on the rings 8a and 8b aligned parallel to each other to restrict a relative movement therebetween.

After overlapping the rings 8a and 8b at a portion in its length direction, the ring 8 is fitted into the recess 7 of the element 1 from the overlapped portion. At this stage, the overlapped portion of the rings 8a and 8b are kept stably as explained, therefore, the ring 8 can be fitted easily into the recess 7 of the element 1 from the overlapped portion.

Then, after fitting the ring 8 into the recess 7 of predetermined pieces of the element 1, or after a completion of such fitting work of the ring 8 into the recess 7 of the element, the assembly and manufacture of the driving belt V according to the second assembling and manufacturing example of the invention is completed.

In addition to above, in case the material of the holding ring 103 is same metal material as those of rings 8a and 8b, the holding ring 103 does not have to be detached from the rings 8a and 8b even after the completion of the fitting work of the ring 8 into the recess 7 of the element 1. That is, the driving belt V can be used with the holding ring 103 being overlapped on the rings 8a and 8b. In this case, the strength of the holding ring 103 is added to the strength of the ring 8. As a result, the strength of the ring 8 is enhanced, and durability of the driving belt V is thereby improved.

Alternatively, in case the holding ring 103 is made of material other than the metal material of rings 8a and 8b such as resin, rubber, cloth, leather and so on, the holding ring 103 is detached from the ring 8 after fitting the ring 8 into the recess 7 of predetermined pieces of the element 1, or after a completion of such fitting work of the ring 8 into the recess 7 of the element 1. As a result, the assembly and manufacture of the driving belt V according to the second assembling and manufacturing example of the invention is completed.

Thus, according to the second assembling and manufacturing example of the invention, when fitting two rows of rings 8a and 8b into the recess 7 of the element 1 to assemble the driving belt V, the rings 8a and 8b are aligned parallel to each other first of all. Then, the holding ring 103 is overlapped on the rings 8a and 8b, more specifically, the inner circumferential face of the holding ring 103 is contacted tightly to the outer circumferential faces of the rings 8a and 8b to restrict a relative movement between the rings 8a and 8b thereby keeping the rings 8a and 8b parallel to each other. The rings 8a and 8b on which the holding ring 103 is overlapped is thereafter overlapped partially in its length direction. Therefore, when overlapping the rings 8a and 8b, the remaining portions of the rings 8a and 8b can be kept parallel to each other stably, and the overlapped portion of the rings 8a and 8b can also be kept stably. For this reason, the ring 8 can be fitted into the recess 7 of the element 1 easily, and productivity of the driving belt V is thereby improved.

Here, the present invention should not be limited to the aforementioned example. That is, although the examples of the present invention thus far describe relate to the driving belt used in a belt type continuously variable transmission, the present invention can also be applied to a driving belt to be applied to another kind of transmission mechanism composed mainly of a belt and pulleys.

The invention claimed is:

1. An assembling method of a driving belt, the driving belt including
    a plurality of elements interlinked annularly, each element including
        a recess that is open to an outer circumferential side of each element, and
        protruding portions that protrude from opposing open end sides of inner walls of the recess, and
    a plurality of rings disposed laterally parallel to each other entirely in a length direction thereof without overlapping each other in the recess of each element and held in an inner circumferential side of the protruding portions to prevent detachment of the plurality of rings, the assembling method comprising:
    aligning the plurality of rings laterally parallel to each other in an entire length thereof;
    overlapping at least a second portion of the rings of the plurality of rings in a length direction thereof while holding a first portion of the plurality of rings laterally parallel to each other by restricting a relative movement between the plurality of rings;
    fitting the plurality of rings into the respective recesses of the plurality of elements;
    restricting the relative movement between the plurality of rings by attaching a detachable fixing member to the first portion of the plurality of rings aligned laterally parallel to each other; and
    detaching the fixing member from the first portion of the plurality of rings after fitting the plurality of rings into the recess of each element.

2. The assembling method of a driving belt as claimed in claim 1, wherein the detachable fixing member includes a holding ring disposed tightly on an outer circumferential face of each ring of the plurality of rings aligned laterally parallel to each other.

3. The assembling method of a driving belt as claimed in claim 1, wherein the detachable fixing member is a clip that extends across the plurality of rings on opposing sides of the plurality of rings and maintains the first portion of the plurality of rings laterally parallel to each other.

4. The assembling method of a driving belt as claimed in claim 1, wherein the detachable fixing member is an adhesive member including at least one of a permanent magnet and an adhesive tape.

5. A manufacturing method of a driving belt, the driving belt including a plurality of rings disposed laterally parallel to each other entirely in a length direction thereof without overlapping each other in a recess of each element of a plurality of elements, the plurality of rings being held by protruding portions of each element, the protruding portions being formed on an opening end side of inner walls of the recess of each element to prevent detachment of the plurality of rings, the manufacturing method comprising:
    arranging the plurality of elements annularly such that the recess in each element is open to an outer circumferential side of each element;
    aligning the plurality of rings laterally parallel to each other in an entire length thereof;
    overlapping at least a second portion of the rings of the plurality of rings in a length direction thereof, while holding a first portion of the plurality of rings laterally parallel to each other by restricting a relative movement between the plurality of rings;
    fitting the plurality of rings in an inner circumferential side of the protruding portions of each element;
    restricting the relative movement between the plurality of rings by attaching a detachable fixing member to the first portion of the plurality of rings aligned laterally parallel to each other; and
    detaching the fixing member from the first portion of the plurality of rings after fitting the plurality of rings into the recess of each element.

6. The manufacturing method of a driving belt as claimed in claim 5, wherein the detachable fixing member includes a holding ring disposed tightly on an outer circumferential face of each ring of the plurality of rings aligned laterally parallel to each other.

7. The manufacturing method of a driving belt as claimed in claim 5, wherein the detachable fixing member is a clip that extends across the plurality of rings on opposing sides of the plurality of rings and maintains the first portion of the plurality of rings laterally parallel to each other.

8. The manufacturing method of a driving belt as claimed in claim 5, wherein the detachable fixing member is an adhesive member including at least one of a permanent magnet and an adhesive tape.

* * * * *